United States Patent
Hirai et al.

(10) Patent No.: US 10,372,392 B2
(45) Date of Patent: Aug. 6, 2019

(54) COMMUNICATION APPARATUS, CONTROL METHOD, AND STORAGE MEDIUM FOR CANCELING A COMMUNICATION SETTING

(71) Applicant: CANON KABUSHIKI KAISHA, Tokyo (JP)

(72) Inventors: Yoshiyuki Hirai, Kunitachi (JP); Tokiko Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/042,961

(22) Filed: Jul. 23, 2018

(65) Prior Publication Data

US 2019/0050177 A1 Feb. 14, 2019

(30) Foreign Application Priority Data

Aug. 9, 2017 (JP) .................................. 2017-154664

(51) Int. Cl.
*G06F 3/12* (2006.01)

(52) U.S. Cl.
CPC .......... *G06F 3/1236* (2013.01); *G06F 3/1209* (2013.01); *G06F 3/1231* (2013.01); *G06F 3/1285* (2013.01)

(58) Field of Classification Search
CPC .... G06F 3/1236; G06F 3/1292; G06F 3/1209; G06F 3/1231; G06F 3/1285; G06F 3/1203; H04N 1/00973; H04N 1/00307; H04N 1/00204; H04N 1/00244; H04N 1/00251; H04N 2201/006; H04N 2201/0046; H04N 2201/0055; H04N 2201/0075; H04N 2201/0094; H04N 2201/0039; H04N 2201/0041; H04N 2201/0082
USPC ......................................... 358/1.1–1.18, 402
See application file for complete search history.

(56) References Cited

U.S. PATENT DOCUMENTS

| | | | | |
|---|---|---|---|---|
| 7,423,772 B2 * | 9/2008 | Honda | .................... | G06K 15/00 358/1.13 |
| 8,315,566 B2 * | 11/2012 | Aibara | .............. | H04W 36/0055 455/41.2 |
| 9,088,863 B2 * | 7/2015 | Suzuki | .................. | H04W 88/06 |
| 9,100,774 B2 * | 8/2015 | Suzuki | .................. | H04W 76/10 |
| 9,565,320 B2 * | 2/2017 | Iwauchi | ............. | H04N 1/00251 |
| 2013/0231051 A1 * | 9/2013 | Naruse | .................. | G06F 3/1204 455/41.2 |
| 2014/0185088 A1 * | 7/2014 | Lee | .................... | H04N 1/00342 358/1.15 |

FOREIGN PATENT DOCUMENTS

JP 2015-023440 A 2/2015

\* cited by examiner

*Primary Examiner* — Gabriel I Garcia
(74) *Attorney, Agent, or Firm* — Canon U.S.A., Inc. IP Division

(57) ABSTRACT

A problem is solved by providing a communication apparatus including a displaying unit that displays, on a display unit, a predetermined screen for executing a second communication setting that allows the communication apparatus to communicate with a terminal apparatus by using a second communication method, which is different from a first communication method, in a case where a cancel instruction is received while the communication apparatus is operating in a predetermined condition.

19 Claims, 9 Drawing Sheets

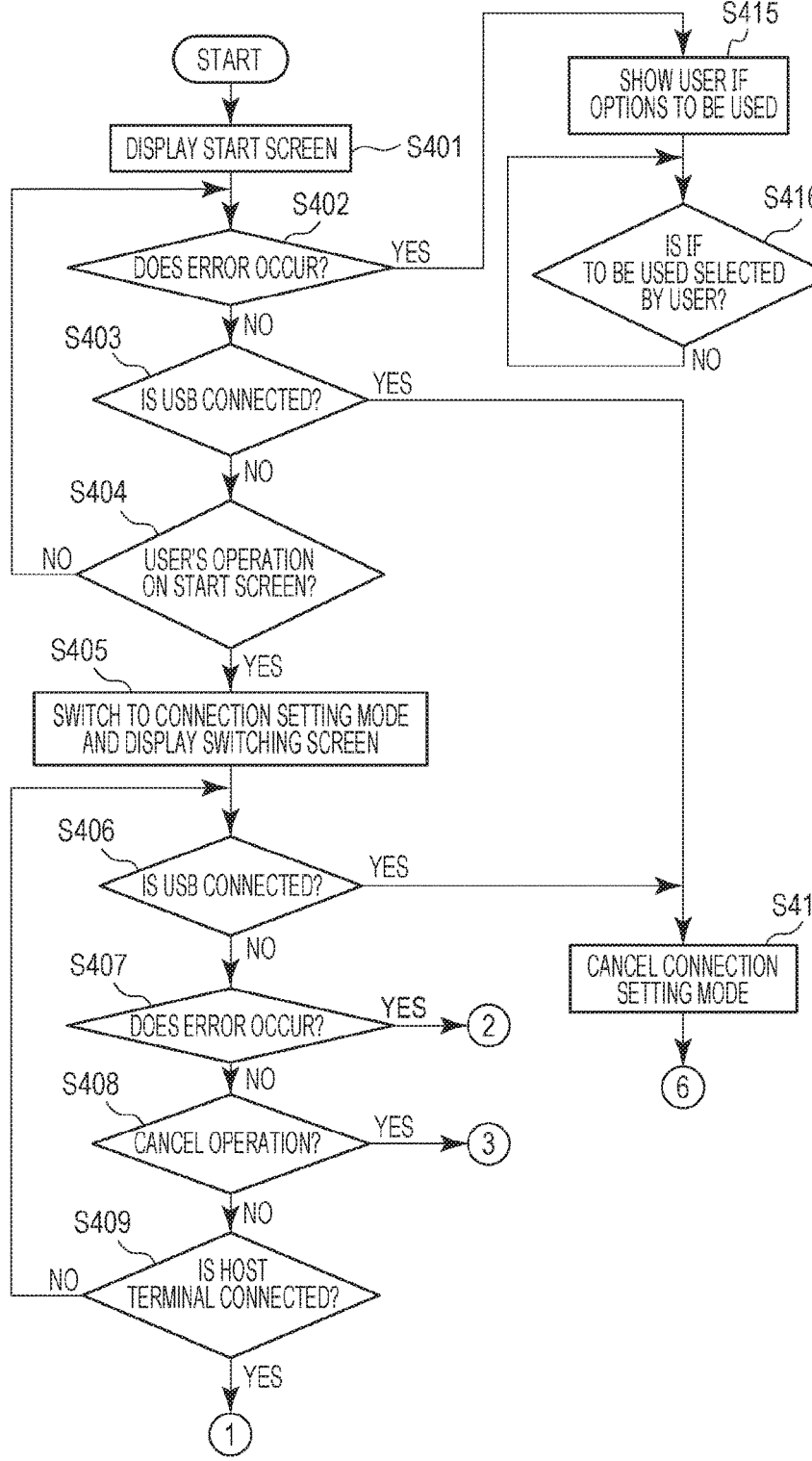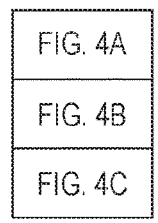

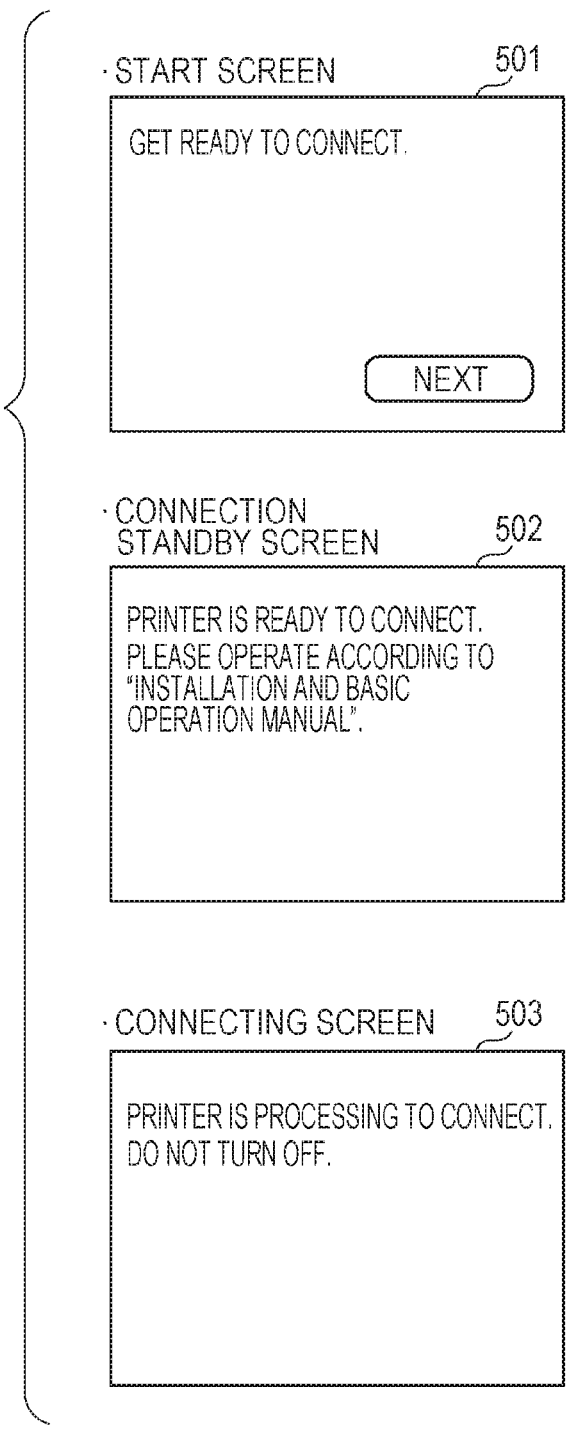

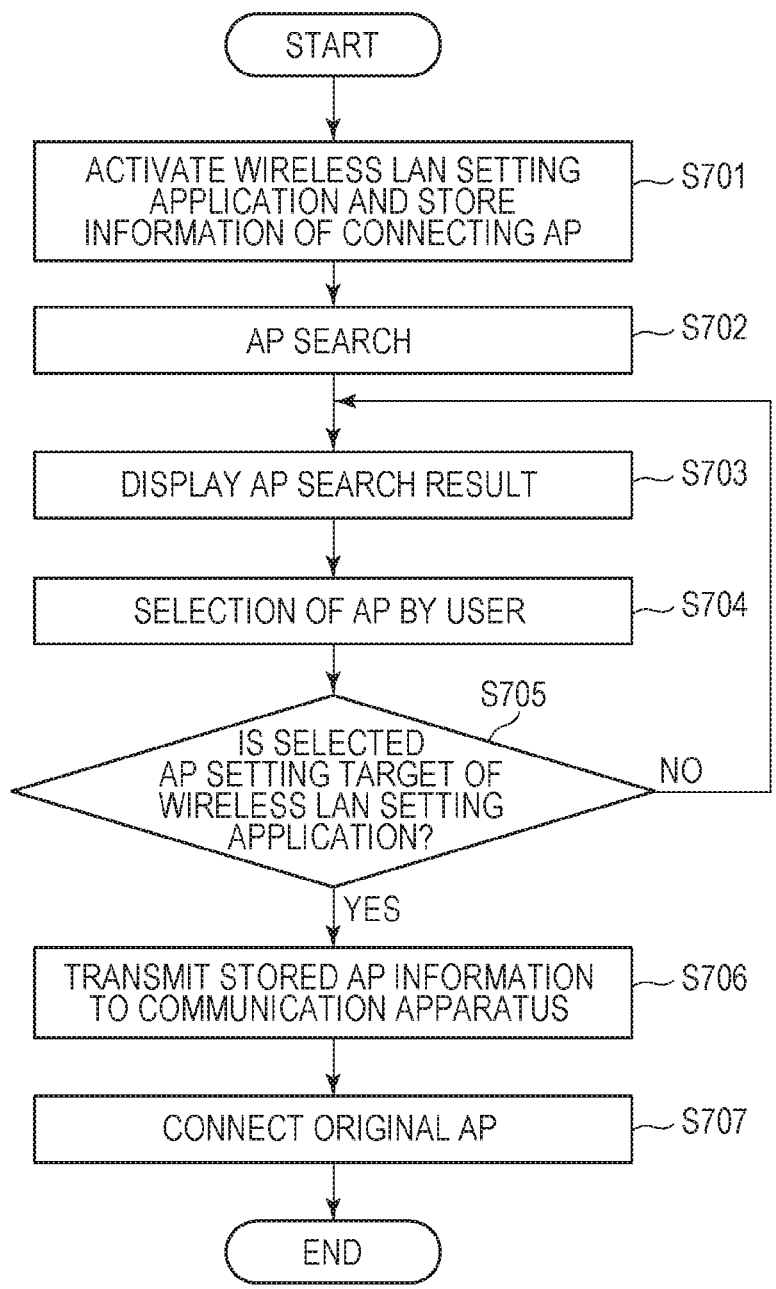

COMMUNICATION APPARATUS, CONTROL METHOD, AND STORAGE MEDIUM FOR CANCELING A COMMUNICATION SETTING

BACKGROUND

Field of the Disclosure

The present disclosure relates to a communication apparatus, a control method, and a storage medium.

Description of the Related Art

Communication apparatuses, such as a printer, which communicate with a terminal apparatus, such as a personal computer (PC), a smartphone, and the like, are known. Such a communication apparatus executes a communication setting to communicate with the terminal apparatus using a predetermined communication method such as Wi-Fi®.

Japanese Patent Laid-Open No. 2015-023440 describes that a communication apparatus operating in a wireless LAN setting mode receives a device information setting command and sets an operation mode based on the received command.

SUMMARY

There is a communication apparatus that can receive a cancel operation from a user to cancel an execution of a communication setting to communicate with a terminal apparatus using a predetermined communication method. However, conventionally, with such a communication apparatus, convenience of the user after executing the cancel operation has not been considered.

In this point of view, some embodiments in the present disclosure improve the convenience of the user after executing a cancel operation, on the communication apparatus, to cancel an execution of a communication setting for communicating with a terminal apparatus using a predetermined communication method.

In order to accomplish this, some embodiments of a communication apparatus include a control unit configured to cause the communication apparatus to operate in a condition that the communication apparatus can receive, from a terminal apparatus, setting information related to a first communication setting for communicating with the terminal apparatus using a first communication method, a first receiving unit configured to receive the setting information from the terminal apparatus, a second receiving unit configured to receive a cancel instruction to cancel an execution of the first communication setting, a setting unit configured to execute the first communication setting in a case where the setting information is received from the terminal apparatus while the communication apparatus is operating in the predetermined condition, and a displaying unit configured to display, on a display unit, a predetermined screen to execute a second communication setting that allows the communication apparatus to communicate with the terminal apparatus using a second communication method, which is different from the first communication method, in a case where the cancel instruction is received while the communication apparatus is operating in the predetermined condition.

Further features will become apparent from the following description of exemplary embodiments (with reference to the attached drawings).

BRIEF DESCRIPTION OF THE DRAWINGS

FIG. 5 is an example of screens that the communication apparatus, according to example embodiment, displays.

FIG. 7 is a flowchart illustrating a flow of processes that a terminal apparatus, according to an example embodiment, sets a communication mode to the communication apparatus.

DESCRIPTION OF THE EMBODIMENTS

First Embodiment

An example embodiment will be described with reference to the drawings. It is noted that embodiments to which a modification or an improvement may be applied based on general knowledge of those skilled in the art should be understood as a range of the present disclosure.

A communication apparatus according to the present embodiment will be described. A printer (printing apparatus) is described as the communication apparatus in the present embodiment; however, without limitation thereto, various types of devices may be applied as long as the device can be connected to a later-described terminal apparatus. For example, in a case of a printer, the present embodiment may be applied to an ink jet printer, a full-color laser beam printer, a black and white printer, and the like. Further, in addition to a printer, the present embodiment may be applied to a copy machine, a facsimile machine, a mobile terminal, a smartphone, a personal computer (PC), a tablet computer terminal, a personal digital assistant (PDA), a digital camera, a smart speaker, and the like. Here, a smart speaker is a device that instructs a device existing in the same network to perform a process according to a voice of a user or notify the user of information obtained via the network according to voice of the user. In addition, the present embodiment may be applied to a multifunction device including a copy function, a facsimile function, and a print function. Further, the present embodiment describes a PC as the terminal apparatus; however, without limitation thereto, the present embodiment may be applied to various devices, such as a mobile terminal, a smartphone, a tablet computer terminal, a PDA, a digital camera, and the like.

Figure 1:
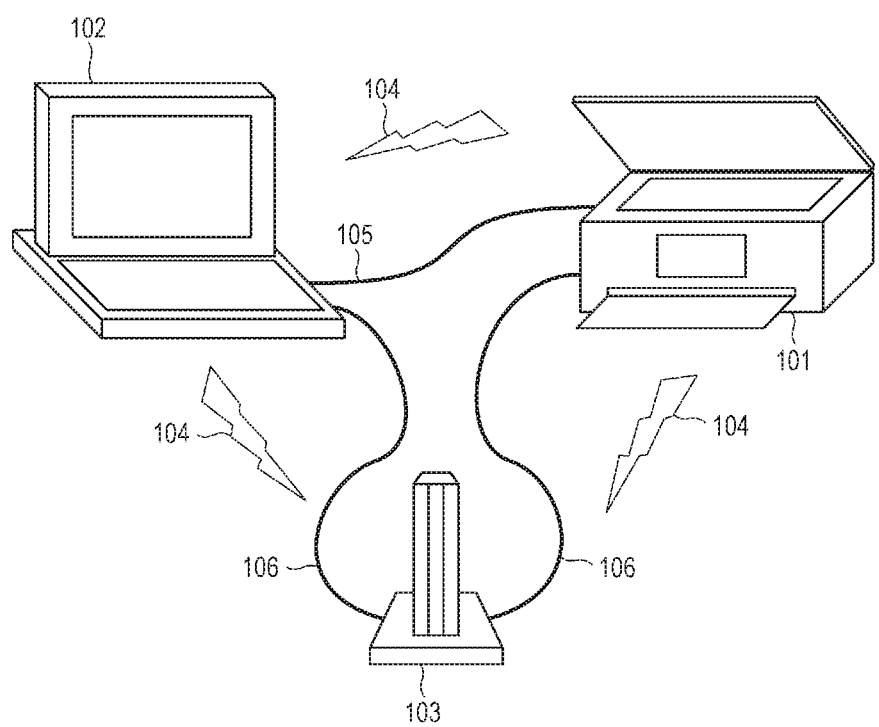
FIG. 1 is a schematic diagram of an information processing system according to an example embodiment.

FIG. 1 is a schematic diagram of an information processing system according to an example embodiment. The information processing system according to the embodiment includes a printer 101, a host terminal 102, and an access point 103. The printer 101 is the communication apparatus in this embodiment. The host terminal 102 is the terminal apparatus in this embodiment. The access point 103 is an external access point existing outside the terminal apparatus and communication apparatus. The terminal apparatus can access a communication apparatus connected to the external access point or the Internet by communicating via the external access point.

According to this embodiment, the printer 101 can be wirelessly connected to the host terminal 102 using a direct connection method, which directly makes a connection in peer-to-peer fashion without connecting to the access point 103. Further, the printer 101 may also be wirelessly connected to the host terminal 102 using an infrastructure connection method, which makes a connection via the access point 103. Here, the communication method used in each connection method is not particularly limited. A wireless LAN 104, a USB 105, a wired LAN 106, and the like according to the IEEE 802.11 series standard may be used.

Figure 2:
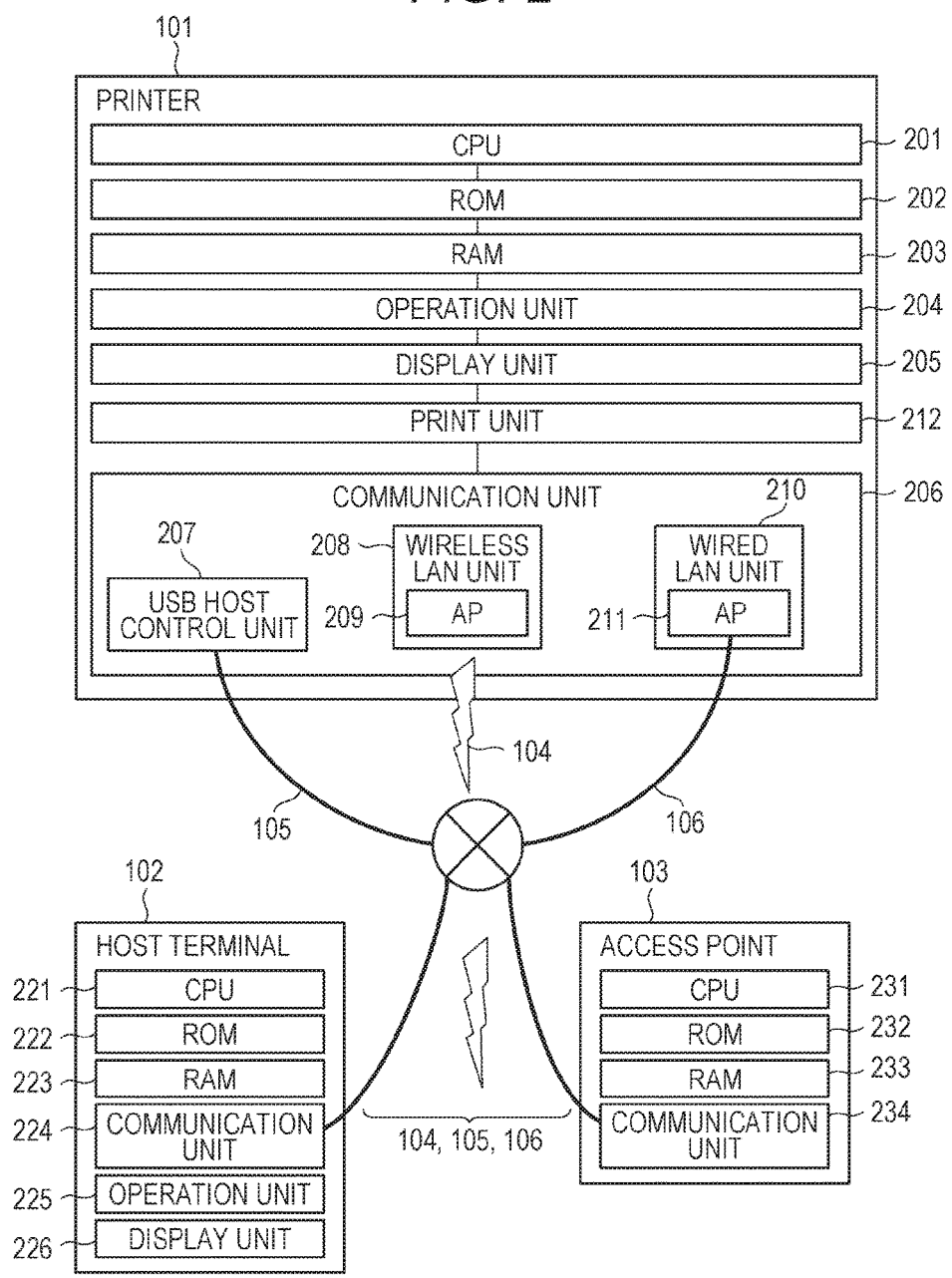
FIG. 2 is a general configuration diagram of devices included in the information processing system according to an example embodiment.

FIG. 2 is a general configuration diagram of example embodiments of the printer 101, the host terminal 102, and the access point 103.

The printer 101 includes a CPU 201, a ROM 202, a RAM 203, an operation unit 204, a display unit 205, and a communication unit 206.

The CPU 201 is a system control unit and controls the entire printer 101.

The ROM 202 stores fixed data, such as a control program executed by the CPU 201, a data table, an embedded operating system (OS) program, and the like. According to some embodiments, each control program stored in the ROM 202 performs a software execution control including scheduling, task switching, interrupt processing, and the like, under a control by the embedded OS program stored in the ROM 202.

The RAM 203 is formed of a static random access memory (SRAM), which needs a backup power source or the like, and stores data using an unillustrated primary battery used for data backup. The RAM 203 stores a program control variable and the like. In addition, the RAM 203 includes a memory area that stores a set value, such as a wireless LAN setting registered by a user, management data related to the printer 101, information indicating whether or not it is a first setting timing (hereinafter, referred to as an initial setting timing) after the printer 101 is turned on, and the like. Here, in other words, the initial setting timing is an initial setting state that the printer 101 has not executed a later described initial setting timing cleaning process yet.

The operation unit 204 is composed of keys and buttons, such as a numeral input key, a mode set key, a determination key, an undo key, a cancel key, a home button, and the like, and has a configuration to receive an operation by the user. The various keys and buttons included in the operation unit 204 may be physical keys and physical buttons or may be virtual keys and virtual buttons. Further, the display unit 205 has a configuration for providing information to the user and is composed of a light emitting diode (LED), a liquid crystal display (LCD), or the like. According to the present embodiment, it is assumed that the display unit 205 for showing information is composed of a segment display using an LED, and the keys to receive operations by the user are formed as physical buttons. By operating the printer 101 via the operation unit 204, the user can activate various functions and set various settings of the printer 101. Here, the display unit 205 may have a configuration without a display unit composed of an LED or an LCD. Further, the display unit 205 may have a configuration that includes a display unit composed of an LED but does not include a display unit composed of an LCD. In addition, by using an operation display unit composed of a touch panel or the like, the operation unit 204 and the display unit 205 may be integrally formed (e.g., in a display operating unit).

Figure 6:
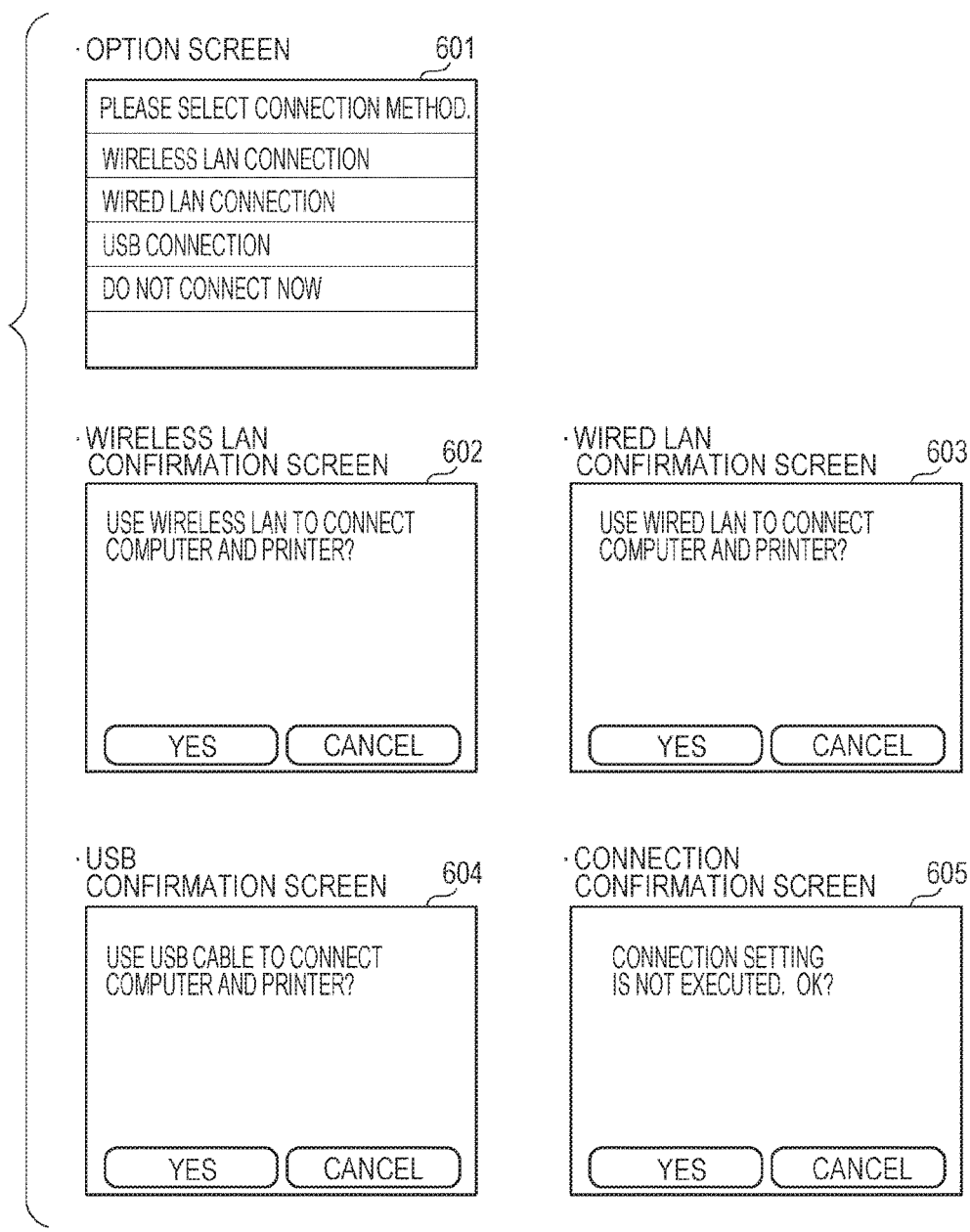
FIG. 6 is an example of screens that the communication apparatus, according to an example embodiment, displays.

According to the present embodiment, the display unit 205 displays various screens. More specifically, for example, the display unit 205 displays a home screen and screens illustrated in FIGS. 5 and 6. The home screen is a screen displayed on the display unit 205 when the printer 101 is started in a state that is not an initial setting timing (normal starting). Further, the home screen is a screen displayed on the display unit 205 when a home button on the operation unit 204 is pressed. By selecting various icons, such as keys and buttons, on the home screen, the user can instruct the printer 101 on various processes. For example, the user can instruct the printer 101 to print, copy, or scan. In addition, the user can give an instruction on a setting process so that an interface selected by the user is used by the printer 101.

A print unit 212 is a print unit composed of a laser beam printer, an ink jet printer, or the like, and prints an image by applying a printing material on a print medium based on color image data or monochrome image data generated by a print control unit (not shown). Here, the print medium to be used is not limited to a sheet of paper, and various types of medium, such as a film, may be used. Further, the size and shape of the print medium to be used are not particularly limited. In addition, the printing material to be used is an ink, toner, or the like.

According to the present embodiment, it is assumed that the printer 101 is an ink jet printer and that the print unit 212 includes a print head for ejecting an ink on the print medium and an ink tank that maintains the ink to be supplied to the print head. Further, it is assumed that the print unit 212 uses an ink cartridge in which the print head and the ink tank are integrally formed and that the print unit 212 includes a carriage to which the ink cartridge is detachably attached and which moves above the print medium when printing. The printer 101 can detect, with an unillustrated cartridge sensor (a detection unit), whether the ink cartridge is being installed to the carriage. Here, the print head and the ink tank may be separately formed, and the print head and the ink tank may be respectively installed to an attachment part of the print unit 212.

Here, to the printer 101, a cover that covers an opening portion of the printer 101 is provided. The cover can turn or move between an open position that the opening portion of the printer 101 is open and a closed position that the opening portion of the printer 101 is covered. When the cover is placed in the open position, the user can visually check inside the printer 101 from the opening portion of the printer 101 and install the ink cartridge in the print unit 212. The printer 101 has an unillustrated cover sensor that detects whether the cover is in a closed position. When it is detected by the cover sensor that the cover is moved from the closed position, the printer 101 moves the carriage from a stand-by position to a position at the opening portion (a cartridge installation position). Then, the user installs the ink cartridge in the carriage. After that, when it is detected by the sensor that the cover has returned to the closed position, the printer 101 moves the carriage from the cartridge installation position to the stand-by position.

The communication unit 206 has a configuration to communicate with another device.

A USB host control unit 207 controls a connection with a Universal Serial Bus (USB) interface and controls the connection using a protocol defined in a USB connection standard. The USB connection standard is a standard that allows a high speed bi-directional data connection and, with this standard, multiple hubs or functions (slaves) can be connected to a single host (master). The USB host control unit 207 has a function as a host in the USB connection. More specifically, the USB host control unit 207 converts data from a USB function control task executed by the CPU 201 into a packet and performs a USB packet transmission to the host terminal 102. Further, the USB host control unit 207 converts the USB packet from an external PC into data and transmits the data to the CPU 201.

A wireless LAN unit 208 wirelessly connects to a terminal device in a network (a network connection using TCP/IP). The wireless LAN unit 208 is a unit to perform a wireless connection to an access point (hereinafter, referred to as an AP) 103 and the host terminal 102. The wireless LAN unit 208 can perform a data (packet) connection in a wireless LAN (hereinafter, referred to as a WLAN) system, which is compatible with IEEE 802.11 series for example. In other words, the wireless LAN unit 208 can connect and communicate with another device using Wi-Fi® for example.

The wired LAN unit 210 has a configuration for communicating via Ethernet® by using a wired LAN cable. The wired LAN unit 210 also includes an AP 211.

By setting a communication mode, the printer 101 operates communicable via the wireless LAN unit 208 in a connection manner corresponding to the communication mode. In other words, according to the present embodiment, the printer 101 is assumed to execute communication using a WLAN in a connection manner corresponding to the set communication mode. In the printer 101, for example, a communication mode such as a connection setting mode, a Wi-Fi Direct® (hereinafter, referred to as a WFD) mode, a soft AP mode, an infrastructure mode (hereinafter, referred to as an INFRA mode), and an ad hoc mode is set.

The connection setting mode is a mode for setting a communication mode to the printer 101. A process of setting the communication mode to the printer 101 is a connection setting process to connect the printer 101 and a device outside the printer 101 by using a predetermined communication method, such as Wi-Fi®. The printer 101 connects with the device outside the printer 101 in a connection manner corresponding to the set communication mode. Here, according to the present embodiment, the printer 101 performs a connection setting process by receiving network connection information related to the connection setting process. In other words, the connection setting mode may be considered as a state that the network connection information related to the connection setting process can be received.

When operating in the connection setting mode, the printer 101 performs an enabling process for enabling the AP 209 by setting software. Here, the AP 209 is an AP, which is enabled only in the connection setting mode, and is, in other words, an AP only for the connection setting mode. When the AP 209 is enabled, the printer 101 periodically transmits a beacon signal (packet) including an SSID and the like of the AP 209. Thus, a terminal apparatus, which can communicate with the printer 101, can detect the AP 209 by performing an AP search. The SSID of the AP 209 is formed in a configuration following a predetermined rule, and the terminal apparatus becomes able to identify the printer 101 by recognizing the rule. The terminal apparatus identifies the AP 209 and communicates with the printer 101 in peer-to-peer (hereinafter, referred to as P2P) manner via the AP 209. Here, the P2P communication refers a direct communication with a terminal apparatus without a device outside the printer 101 and outside the terminal apparatus (for example, an AP of a wireless LAN router and the like). As the rule, for example, information that identifies a model or a series including the model of the printer 101, an MAC address of the printer 101, a name of the manufacturer, and the like are used. The SSID is stored in the ROM 202 or the like in advance. In the connection setting mode, the printer 101 can set, by itself, a communication mode corresponding to the network condition around the printer 101. For example, the communication mode is set by executing a reception process to receive setting information from the terminal apparatus. The setting information is, for example, later described AP information or information related to a communication mode to be set to the printer 101. Since this process can be performed without a cable, the connection setting mode is sometimes referred to as a cableless setup mode. The connection setting mode may be considered as a condition that the AP only for the connection setting mode is enabled or a condition that the AP only for the connection setting mode is enabled and the printer 101 is connected to the terminal apparatus via the AP.

The WFD mode is a mode to perform a wireless connection according to a WFD standard. When the printer 101 operates in the WFD mode, the printer 101 performs a direct wireless connection with the terminal apparatus in a P2P connection system. In this case, the device AP via which the connection is made is determined by Group Owner Negotiation. Here, the printer 101 operating in the WFD mode may connect to the terminal apparatus always via the AP in the printer 101 without executing Group Owner Negotiation. When the WFD mode is set to the printer 101, the host terminal 102 transmits setting information indicating the WFD mode to the printer 101, which is operating in the connection setting mode.

The soft AP mode is a mode for performing a direct wireless connection by P2P with the terminal apparatus via the AP in the printer 101. Here, the AP which is enabled here is assumed to be different from the AP enabled in the connection setting mode and the AP enabled in the WFD mode. In other words, the AP enabled in the connection setting mode, the AP enabled in the WFD mode, and the AP enabled in the soft AP mode have a different SSID or a different password, respectively. When the soft AP mode is set to the printer 101, the host terminal 102 transmits setting information indicating the soft AP mode to the printer 101, which is operating in the connection setting mode.

The INFRA mode is a mode in which the printer 101 performs a wireless connection with the terminal apparatus using a connection method that connects via a device (such as an AP in a wireless LAN router) other than the printer 101 and the terminal apparatus. Here, to operate in the INFRA mode, the printer 101 needs to receive an SSID of the AP that the printer 101 uses in the INFRA mode and a parameter used by the printer 101 to use the AP from the terminal apparatus. Hereinafter, the SSID and the parameter are referred to as AP information. And, to operate in the INFRA mode, the printer 101 needs to register the AP information in the printer 101 itself.

The ad hoc mode is a mode in which the printer 101 and the terminal apparatus perform a direct wireless P2P connection. In the ad hoc mode, the connection is made without using an AP in the devices that perform the connection, unlike the WFD mode and the soft AP mode. When the printer 101 operates in the ad hoc mode, a wireless connection parameter, which is common with the terminal apparatus, needs to be received as setting information and registered in the printer 101.

Here, the modes are not limited to those which are exclusively set, and more than one mode may be set at the same time. More specifically, for example, the printer 101 may operate in the soft AP mode and the INFRA mode at the same time or operate in the WFD mode and the INFRA mode at the same time.

The above described components are connected to one another via a CPU bus (not illustrated), which is controlled by the CPU 201.

The host terminal 102 includes a CPU 221, a ROM 222, a RAM 223, a communication unit 224, an operation unit 225, and a display unit 226. Since the components in the host terminal 102 have configurations that are the same as those in the printer 101 respectively, the explanation thereof will be omitted. The host terminal 102 uses the communication unit 224 to connect to the printer 101 and access point 103 using a communication method, such as the wireless LAN 104, USB 105, wired LAN 106, and the like.

The access point 103 includes a CPU 231, a ROM 232, a RAM 233, and a communication unit 234. Since the components in the access point 103 have configurations that are the same as those in the printer 101, the explanation thereof will be omitted. The access point 103 uses the communication unit 234 to connect to the printer 101 and host terminal 102 using a communication method, such as the wireless LAN 104, USB 105, wired LAN 106, and the like.

As described above, the printer 101 moves the carriage to the cartridge installation position based on the sensor detection result and receives an operation by the user to install (mount) an ink cartridge. Here, the sensor does not operate in a soft-off state and a hard-off state. Thus, to have the ink cartridge properly installed to the carriage in the cartridge installation position, it is preferable that the printer 101 receives the operation by the user to install the ink cartridge in a soft-on state. Thus, according to the present embodiment, a set up manual provided with the printer 101 includes description that encourages the user to install the ink cartridge while the printer 101 is in a soft-on state.

However, in a case where the user has not read the set up manual for example, the printer 101 may receive the operation by the user to install the ink cartridge in a soft-off state. To install an ink cartridge to the printer 101 in a soft-off state, the user may move the carriage by force into the cartridge installation position, for example. Such an operation may cause an error related to the print unit 212, including damage in a drive system of the carriage, for example.

In other words, when the printer 101 receives an operation by the user to install an ink cartridge in a soft-off state, an error state related to the print unit 212 may often occur.

Here, the printer 101 executes a detection process for detecting whether an error related to the print unit 212 has occurred (an error state) when executing an ink cartridge cleaning process. When the printer 101 is in an error state, it is preferable to execute a notification process to notify a terminal apparatus, which is communicating with the printer 101, that the printer 101 is in an error state. When the notification process is executed, a display unit of the terminal apparatus displays a screen to provide a notification that the printer 101 is in an error state so that the user operating the terminal apparatus can maintain the printer 101. Here, there may be a case where the printer 101 itself cannot display a screen to provide notification that the printer 101 is in an error state because the printer 101 does not have a display unit or has only a simplified display unit such as a segment display. In such a case, it is further preferable to execute a notification process to the terminal apparatus, which is communicating with the printer 101.

However, for example, when the terminal apparatus is not connected to the printer 101 during an ink cartridge cleaning process, the printer 101 may not able to notify the terminal apparatus of an error in real time. Thus, there is a problem that the terminal apparatus cannot be notified of an error cannot be notified to the terminal apparatus in a configuration that a setting of a connection with the terminal apparatus is performed after the cleaning process.

Further, for example, when the printer 101 is an error state, there may be cases that the cleaning process is not completed or an after-delivery initial sequence is suspended. Thus, there has been a problem that a connection setting is not started in a configuration that a setting of a connection with the terminal apparatus is performed after the cleaning process.

Thus, according to the present embodiment, the printer 101 performs the connection setting process at preferable timing. More specifically, the printer 101 performs the connection setting process before the ink cartridge cleaning process in a case where an operation by the user to install the ink cartridge has been received in a soft-off state.

Figure 3:
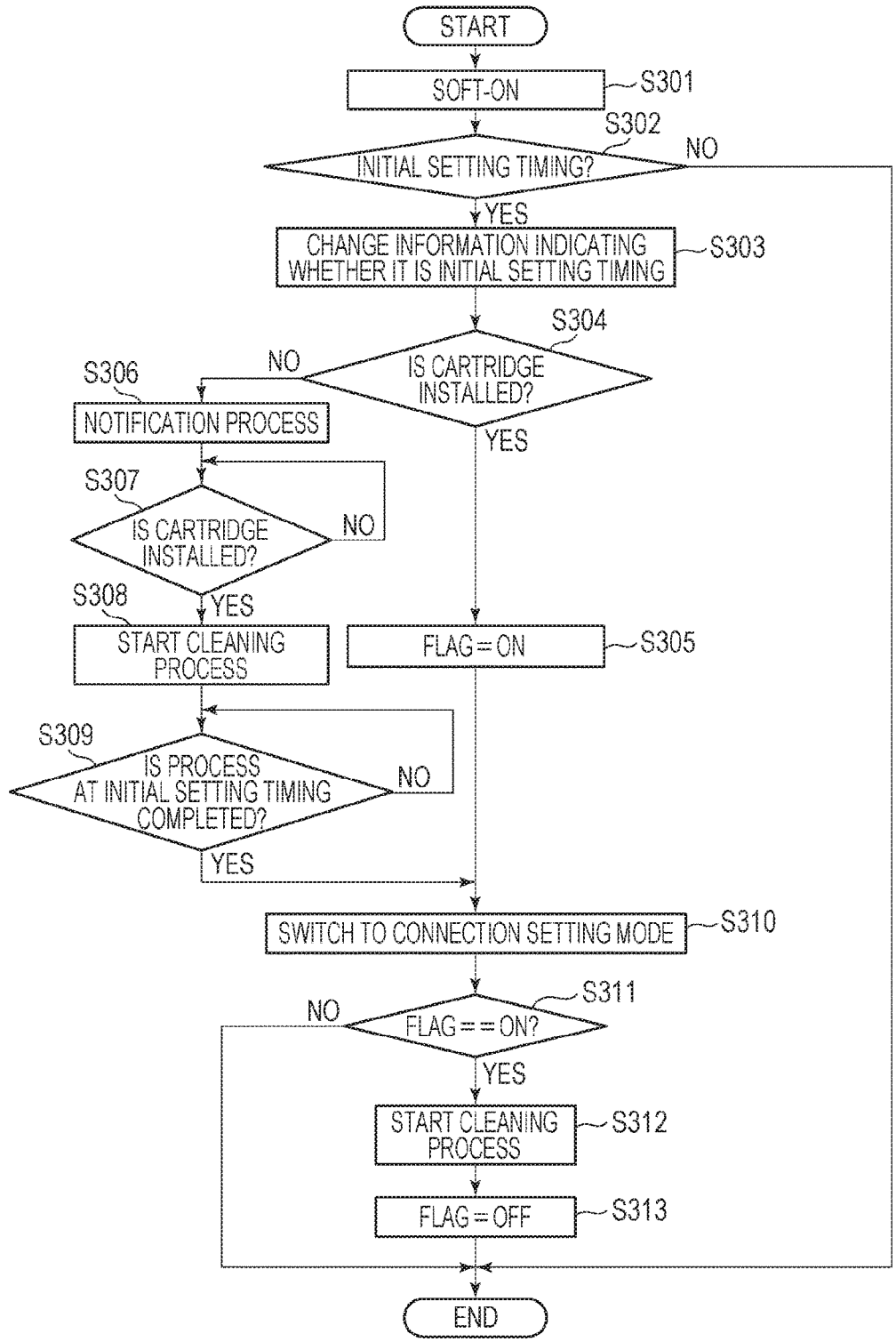
FIG. 3 is a flowchart illustrating a flow of an after-delivery initial sequence performed by a communication apparatus, according to an example embodiment, at an initial setting timing.

FIG. 3 is a flowchart illustrating an after-delivery initial sequence, which is a process performed by the printer 101 according to the present embodiment at an initial setting timing. Here, this flowchart is realized by the CPU 201 that loads, to the RAM 203, a control program, which is related to the flowchart and stored in the ROM 202 or an external storage (not illustrated) and executes the control program. Here, this flowchart is started by the printer 101 in a soft-off state.

Firstly, in S301, when it is detected that a power supply button of the printer 101 is pressed, the CPU 201 changes the printer 101 from a soft-off state to a soft-on state.

Next, in S302, the CPU 201 refers to information that indicates whether it is an initial setting timing, which is stored in the RAM 203, and determines whether it is an initial setting timing. More specifically, in a case where the user activates the printer 101 the first time after the printer 101 is delivered, an initial setting timing flag is ON in the RAM 203. On the other hand, in a case that the activating process of the printer 101 has been performed earlier once or more, the initial setting timing flag is OFF in the RAM 203. The CPU 201 makes the determination in S302 by referring to ON or OFF of the initial setting timing flag. It is noted that this determination may be made by determining whether the printer 101 has executed the after-delivery initial sequence before, for example.

When it is not an initial setting timing, the CPU 201 ends the process. Except for a case that a connection environment of the printer 101 has changed, in general, a setting of the communication mode does not need to be performed again when it is not in the initial setting timing. Thus, with such a configuration, it can be prevented that the printer 101 performs the process to set the communication mode every time when the printer 101 enters a soft-on state. Here, in this case, a UI or the like to inquire the user whether to execute a process to set the communication mode may be displayed and the process to set the communication mode may be executed according to the response from the user.

On the other hand, when it is an initial setting timing, in S303, the CPU 201 changes the information indicating whether it is the initial setting timing to indicate that it is not an initial setting timing when the printer 101 is switched to a soft-on state next time or later. More specifically, the CPU 201 changes the content of the initial setting timing flag. Here, according to the present embodiment, the process in S302 is executed based on ON or OFF of the initial setting timing flag; however, information other than the flag may be used. In this case, for example, it is assumed that the information indicating an initial setting timing is stored in the RAM 203 before delivery. Then, in S302, it is determined whether the information indicating an initial setting timing is to be stored in the RAM 203, and the information indicating the initial setting timing is deleted in a later process. Further, the process in S303 may be executed anytime after it is determined whether it is an initial setting timing. For example, the process may be executed after a communication mode is set to the printer 101 in S314, or may be executed after the information of wireless LAN setting of the printer 101 is made invalid in step S316.

In S304, the CPU 201 determines whether the ink cartridge is installed to the print unit 212 based on a detection result by the detection unit. Here, in a configuration in which the print head and the ink tank are formed as separate elements, it is determined whether at least the print head is installed to the print unit 212. In a case where the determination is NO, the CPU 201 proceeds to S306 and, in a case where the determination is YES, the CPU 201 proceeds to S305.

According to the present embodiment, it is assumed that the ink cartridge and print head cannot be installed or removed to and from the carriage after the printer 101 is switched to a soft-on state in S301 and before the process in S304 is executed. In other words, it is assumed that, even when the cover is moved from the closed position, the carriage does not move to the cartridge installation position. Thus, in a case where the determination is YES in S304, it is considered that the ink cartridge is installed to the print unit 212 before the printer 101 switches to a soft-on state (in other words, while the printer 101 is in a soft-off state or a hard-off state).

Thus, in S305, the CPU 201 switches mounting flag information indicating whether the ink cartridge is installed in a soft-off state or a hard-off state to information indicating that the ink cartridge is installed in a soft-off state or a hard-off state. This makes the mounting flag information to be an ON state. Here, the mounting flag information is stored in the RAM 203. After that, the CPU 201 does not execute the initial setting timing cleaning process and proceeds to S310. Here, the CPU 201 does not have to adjust a printing position on a print medium by the print head (hereinafter, referred to as a registration adjustment) prior to S310.

On the other hand, in a case where the determination is NO in S304, it is assumed that the ink cartridge is not installed to the print unit 212 before the printer 101 is switched to a soft-on state (that is, while the printer 101 is in a soft-off state and a hard-off state).

Then, in S306, the CPU 201 gives, to the user, a notice related to the print unit 212 by blinking a light emitting diode (LED) of the display operating unit or displaying a certain screen on the LCD of the display operating unit. More specifically, the CPU 201 provides notification that the printer 101 is waiting for installation of an ink cartridge and provides notification how to install the ink cartridge. Here, the method of notifying is not limited, and the CPU 201 may display a notification screen on the LCD of the display operating unit, blink the LED of the display operating unit with a certain method, or provide notification with sound.

After that, in S307, the CPU 201 determines whether the ink cartridge is installed to the print unit 212 based on the detection result by the detection unit. Here, in a case of a configuration that the print head and the ink tank are formed as separate elements, it is determined whether both of the print head and ink tank are installed to the print unit 212. In a case of determination of YES, the CPU 201 proceeds to S308 and, in a case of determination of NO, the process in S307 is re-executed. Here, there is not timeout setting in the determination in S307 and, the determination in S307 is repeated until it is determined as YES or the printer 101 is switched to a soft-off state or a hard-off state. Further, the CPU 201 may continue the notification in S306 until it is determined as YES in S307.

In S308, the CPU 201 starts the initial setting timing cleaning process. More specifically, the CPU 201 firstly moves the carriage to a position where a cleaning member, such as a waste ink absorption pad and a capping mechanism used to cap a discharge opening of the print head, is provided. After that, the CPU 201 caps the discharge opening of the print head with the capping mechanism and activates a pump connected to the capping mechanism. With this, the CPU 201 cleans the ink in the discharge opening by generating negative pressure inside the capping mechanism and by absorbing and discharging a foreign substance, such as thickened ink, an air bubble, or the like, from the discharge opening. Further, the CPU 201 performs wiping (cleans by wiping) of a foreign substance, such as ink, on the discharge opening surface of the print head with a wiper. Here, the cleaning process may also be executed at timings before the print is started, when a predetermined period of time has passed after a previous printing, or when it is switched to a soft-on state after an abnormal termination for example, in addition to the initial setting timing. The initial setting timing cleaning process may be different from the normal cleaning process. More specifically, at the initial setting timing, it may be an object to fill, with the ink, a flow path from the head to the nozzle or from the ink tank to head, and a negative pressure suction force may be made greater, a suction amount may be increased, and a number of suctions may be increased, compared to the normal cleaning operation. Alternatively, the ink in the print head may be heated and its viscosity may be reduced.

Here, the CPU 201 detects an error that occurs in the print unit 212 when the initial setting timing cleaning process is executed. The error detected here is, for example, a head incomplete mounting error or a carriage position error.

The head incomplete mounting error is an error that the ink cartridge (print head) is installed to the carriage in an incomplete manner. For example, when the ink cartridge is installed to the carriage in a complete manner, the ink cartridge may stick out in a drive path of the carriage. In this case, when the carriage moves, the ink cartridge contacts a predetermined configuration inside the printer 101 and the carriage is made to stop at the position of the predetermined configuration. The CPU 201 detects, for example, a moving distance of the carriage and, when the detected moving distance corresponds to the moving distance from the cartridge installation position to the predetermined configuration position, an occurrence of a head incomplete mounting error is detected. Further, for example, when the ink cartridge is installed to the carriage in an incomplete manner, the ink cartridge may come off the carriage while the carriage is moving or during the cleaning process. The CPU 201 detects, for example, whether the ink cartridge is being installed to the carriage with a cartridge sensor. Then, the CPU 201 detects an occurrence of a head incomplete mounting error when the cartridge sensor detects that the ink cartridge is not installed to the carriage while the carriage is moving or during the cleaning process. Here, since the head incomplete mounting error is canceled when the user reopens the cover and reinstalls the ink cartridge correctly, the printer 101 does not have to be switched to a soft-off state to cancel the head incomplete mounting error.

A carriage position error occurs when there is a foreign substance in the drive path of the carriage. For example, when there is a foreign substance in the drive path of the carriage, since the foreign substance disturbs the movement of the carriage, the moving distance of the carriage becomes small. Thus, the CPU 201 detects, for example, an actual moving distance of the carriage and a force (drive force) to drive the carriage and, when the actual moving distance is smaller than the drive force, an occurrence of a carriage position error is detected. The carriage position error is canceled when the printer 101 is switched to a soft-off state and the foreign substance is removed.

When an error is detected, the CPU 201 executes an error notification process to provide notification of the detected error. More specifically, for example, on the display operating unit, a screen to provide notification of the detected error is displayed. Further, when an error is detected during the initial setting timing cleaning process, which is started in later described S318 for example, the printer 101 is connected to the terminal apparatus. In such a case, the CPU 201 transmits, to the terminal apparatus, information used to display a screen of a detected error notification on the display unit included in the terminal apparatus. With this configuration, the terminal apparatus displays, on the display unit included therein, the screen related to the error that occurred in the printer 101. Here, the CPU 201 may have a configuration to execute the error notification process when an inquiry is received from the terminal apparatus connected to the printer 101.

Next, in S309, the CPU 201 determines whether a necessary process at the initial setting timing is completed. When the necessary process at the initial setting timing is not completed, the CPU 201 repeats the process in S309 until the process ends and, when the necessary process at the initial setting timing is completed, the CPU 201 executes the connection setting process in S310 and following steps. Here, according to the present embodiment, it is assumed that the necessary process at the initial setting timing is the initial setting timing cleaning process and the process in S309 is executed; however, this configuration does not set any limitation. For example, the registration adjustment may be included in the necessary process at the initial setting timing.

In this manner, when it is determined in S304 that the ink cartridge is not installed, the ink cartridge is installed after the printer 101 is switched to a soft-on state in the processes of S306 and S307. According to the present embodiment, in a case where the ink cartridge is installed to the printer 101 being in a soft-on state in this manner, a connection setting process may be executed after the ink cartridge cleaning process. The reason thereof will be explained.

As described later, the printer 101 enables the AP 209 to become a connection setting mode when executing the connection setting process. The AP 209 is an AP which is enabled only in the connection setting mode and, since it needs to be easily connectable to the host terminal 102 for the connection setting process, the security of the AP is relatively low. Thus, it is not preferable that the AP 209 is kept enabled for a long period of time and, in the connection setting process, a timeout process is performed. Further, when the connection setting process is timed out and suspended, all the after-delivery initial sequence, including the cleaning process, may be suspended. Thus, in a configuration in which the cleaning process is executed after the connection setting process, there is a problem that the cleaning process may not be executed.

Further, since the host terminal 102 and the printer 101 become communicable after the connection setting process is executed, the host terminal 102 becomes able to transmit a print job to the printer 101. Thus, in a configuration in which the cleaning process is executed after the connection setting process, since a print job is transmitted in a condition that the cleaning process is not completed, there is a problem that the cleaning process may not be properly completed or that the start of the print job may be delayed.

Because of the reasons described above, in a case where the ink cartridge is installed to the printer 101 in a soft-on state, the connection setting process is executed after the cleaning process, unlike the case where the ink cartridge is installed to the printer 101 in a soft-off state. It is noted that such a process is not essential in the present embodiment. More specifically, in a case where the ink cartridge is installed to the printer 101 in a soft-on state, the connection setting process may be executed before the cleaning process, like the case where the ink cartridge is installed to the printer 101 in a soft-off state.

In S310, the CPU 201 executes a connection setting process. The details of this process will be described later with reference to FIGS. 4A to 4C.

In S311, the CPU 201 determines whether the mounting flag information indicates that the ink cartridge is installed in a soft-off state or a hard-off state (ON state). In a case where the flag information is not an ON state, since the ink cartridge has been installed in a soft-on state, the initial setting timing cleaning process is executed. Thus, the CPU 201 ends the process. On the other hand, in a case where the mounting flag information is in an ON state, since the ink cartridge has been installed in a soft-off state or a hard-off state, the initial setting timing cleaning process is not executed. Thus, in S312, the CPU 201 starts the initial setting timing cleaning process, like the process in S308. After that, in S313, the CPU 201 updates the mounting flag information with information indicating that the ink cartridge has not been installed in a soft-off state or a hard-off state (information of OFF state) and ends the process.

Here, the printer 101 is also able to communicate with the terminal apparatus using a universal serial bus (USB). Since the above described communication mode is a mode for communicating in a wireless communication method, the printer 101 does not have to set a communication mode when communicating with the terminal apparatus using a USB. Thus, for example, the printer 101 may have a configuration that the connection setting process is not executed (it is not switched to the connection setting mode) when it is switched to a soft-on state if the printer 101 is connected to the terminal apparatus using a USB. Further, for example, when the printer 101 is connected to the terminal apparatus using a USB while the connection setting process is executed, the printer 101 may have a configuration that the connection setting process is ended (the connection setting mode is ended) even in a condition that the connection setting process is not completed.

Here, an advantage of some embodiments will be described. According to the present embodiment, the printer 101 can communicate with another device using various interfaces such as a "wireless LAN", a "wired LAN", a "USB", and the like. Here, the printer 101 performs a communication using an interface, which is specified as an interface to be used by the printer 101 from those interfaces. An interface desired by the user is selected as the interface that the printer 101 uses and, generally, the "wireless LAN" is selected. Thus, according to the present embodiment, in the connection setting process in the after-delivery initial sequence, a setting process to communicate using the "wireless LAN" (that is, a process in the connection setting mode) is executed automatically (without user's instruction). On the other hand, as the interface used by the printer 101, there may be a user who desires an interface other than the "wireless LAN". Such a user executes an operation to cancel a setting process for performing communication using the "wireless LAN" (cancel operation) to make the printer 101 use an interface other than the "wireless LAN".

On the other hand, there is a configuration that, when this operation is executed, the setting process for communicating using the "wireless LAN" is simply canceled and the screen displayed by the printer 101 is switched to a home screen, a screen for receiving an instruction to execute a setting process only related to the "wireless LAN". With such a configuration, there is a problem that, after executing the operation, the user has to execute the operation of a setting process for communicating using an interface other than the "wireless LAN" from the beginning. Furthermore, there is a problem that convenience of the user who executes the cancel operation is decreased.

Thus, according to the present embodiment, a screen that may improve the convenience of the user who executes cancel operation is displayed. More specifically, when an operation to cancel the setting process for performing a communication using the "wireless LAN" is executed, a screen other than the home screen for executing a setting process to perform a communication using an interface other than a "wireless LAN" is automatically displayed.

Figure 4B:
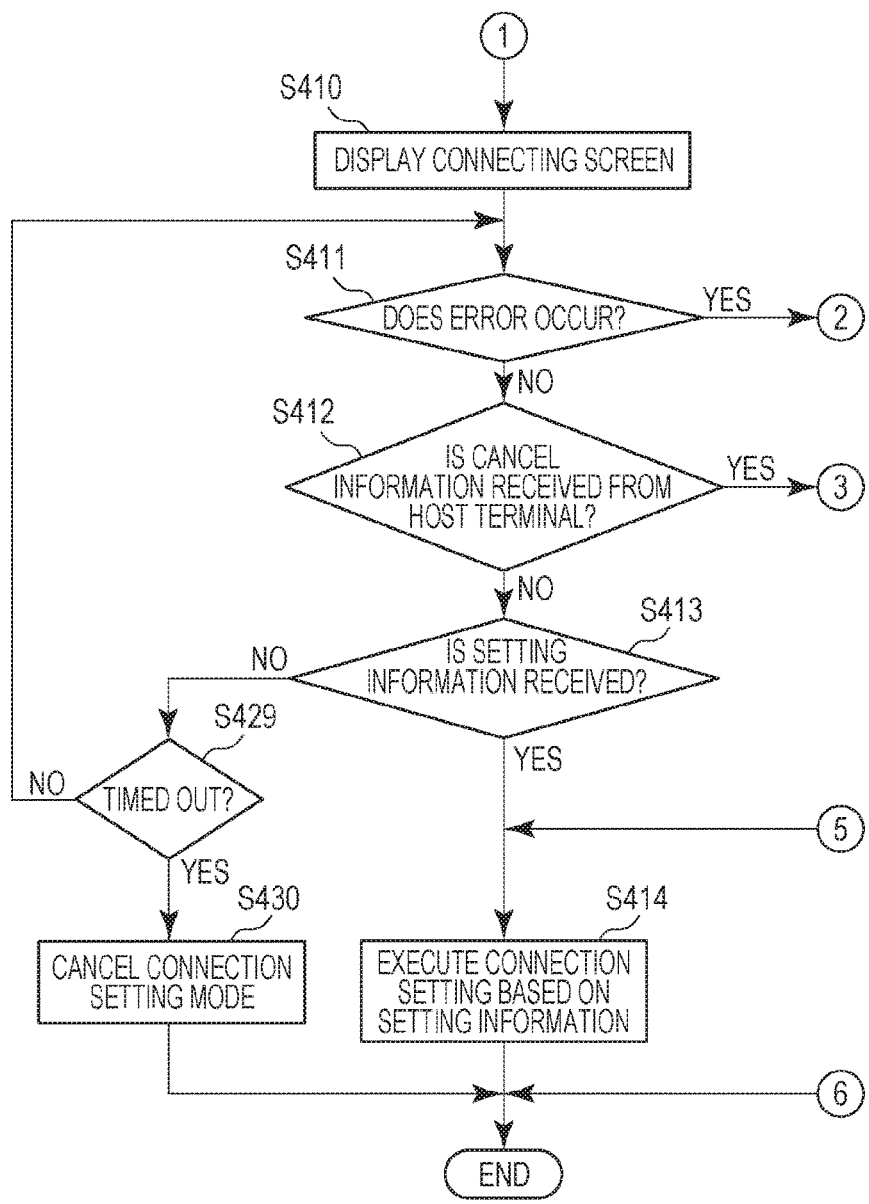
FIG. 4 includes FIGS. 4A to 4C, which constitute a flowchart illustrating a connection setting process executed by the communication apparatus according to an example embodiment.
Figure 4C:
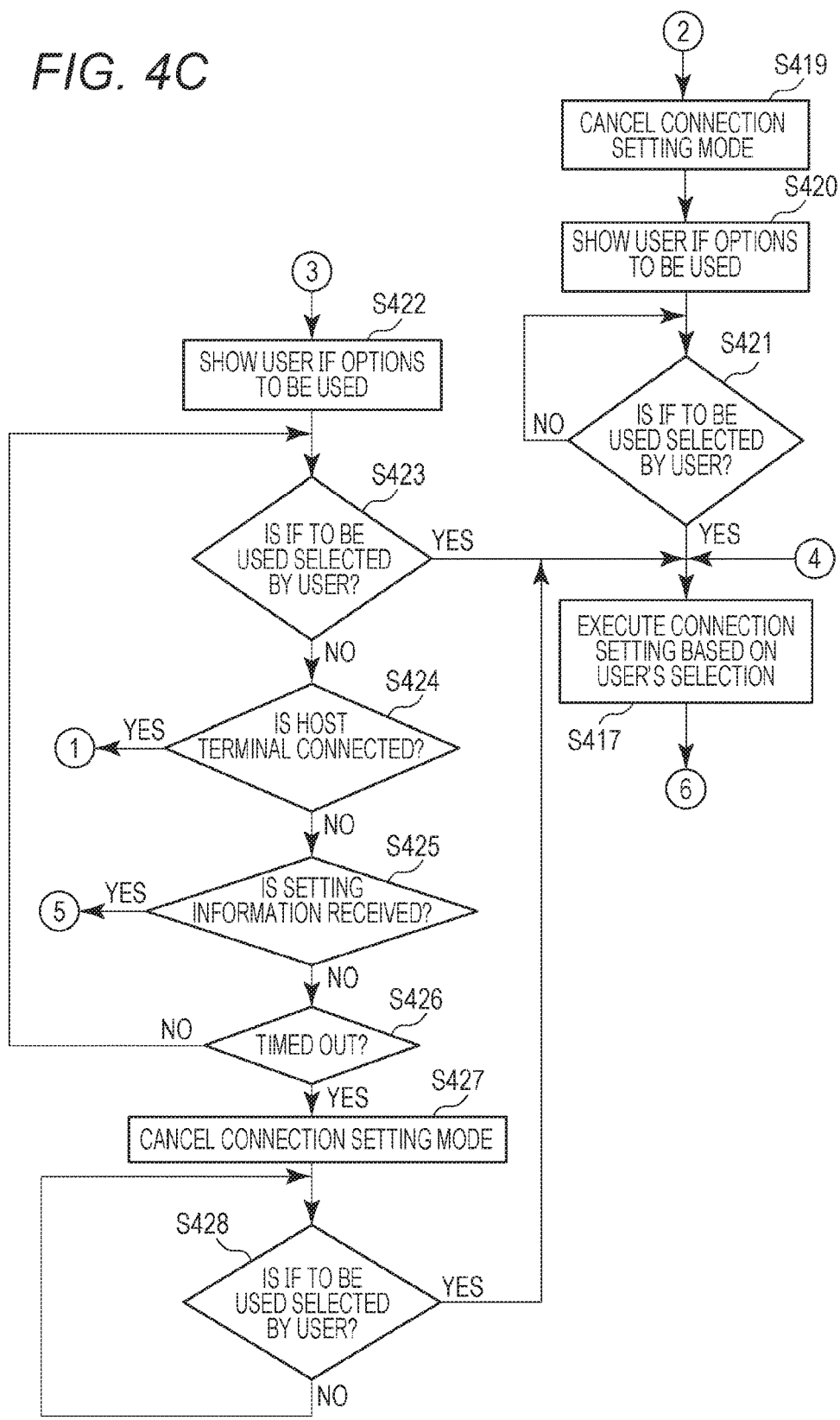

FIGS. 4A to 4C constitute a flowchart illustrating a connection setting process executed by the printer 101. Here, the flowchart is realized by the CPU 201 that loads, to the RAM 203, a control program related to the flowchart stored in the ROM 202 or external storage (not illustrated) and executes the control program. Here, it is assumed that the process illustrated in this flowchart is a process corresponding to S310 in FIG. 3.

In S401, the CPU 201 displays a start screen to notify the user that the operation of the connection setting mode is started (for example, a start screen 501 in FIG. 5). The start screen includes a button to receive a start instruction of an operation in the connection setting mode from the user.

In S402, the CPU 201 determines whether an error has occurred in the printer 101. More specifically, the CPU 201 determines whether an error has occurred in the wireless LAN unit 208 (whether it is in a condition that a wireless LAN communication cannot be performed). When the CPU 201 determines that an error has occurred in the printer 101, the process proceeds to S415, and when the CPU 201 determines that an error has not occurred in the printer 101, the process proceeds to S403. Here, when the connection setting process is terminated due to the error, the processes in S311 to S313 are omitted and the cleaning process may not be executed.

In S415, the CPU 201 shows the user a plurality of interfaces including an interface which is not the "wireless LAN" as options of the interfaces to be used by the printer 101. More specifically, the CPU 201 displays, on the display unit 205, an option screen 601 illustrated in FIG. 6. The options of the interfaces to be used by the printer 101 are, for example, the "wired LAN", the "USB", and the like. Here, the options of the interfaces to be used by the printer 101 may include the "wireless LAN" in addition to the interface, which is not the "wireless LAN". Further, for example, before the screen 601 is displayed, a screen or the like to inquire the user whether the setting process to perform a communication using the interface, which is not the "wireless LAN" may be executed. In this case, for example, in a case where an operation indicating execution of the setting process to perform a communication using the interface, which is not the "wireless LAN" is executed while the screen is being displayed, the screen 601 is displayed.

In S416, the CPU 201 determines whether one of the options of the interfaces to be used by the printer 101 is selected by the user. More specifically, the CPU 201 determines whether user's operation to select one of the options of the interfaces to be used by the printer 101 is received. When it is determined that one of the options of the interfaces used by the printer 101 is selected by the user, the CPU 201 proceeds to S417. On the other hand, when it is determined that one of the options of the interfaces to be used by the printer 101 is not selected by the user, the CPU 201 repeats the process in S416 until a selection by the user is received.

Here, in S415, another screen may be displayed on the display unit 205 before the plurality of interfaces including an interface, which is not the "wireless LAN", are shown to the user. More specifically, for example, a screen to inquire the user whether to cancel the setting process to perform a communication using the "wireless LAN", or a screen to inquire the user whether to execute the setting process to perform a communication using an interface, which is not the "wireless LAN", may be displayed.

In S417, the CPU 201 performs the setting process based on a selection operation received from the user. More specifically, the CPU 201 specifies the interface selected by the user as an interface to be used by the printer 101, and sets the interface so that the printer 101 performs communication using the specified interface thereafter. More specifically, when the "wireless LAN" is selected by the user, the CPU 201 firstly displays a screen, such as the screen 602 of FIG. 6, to confirm with the user whether to connect the host terminal 102 and the printer 101 using the "wireless LAN". Then, when it is confirmed that the host terminal 102 and printer 101 are to be connected using the "wireless LAN" (when a "YES" button is pressed), the CPU 201 searches an access point near the printer 101. Then, the CPU 201 connects to an access point selected by the user from the searched access points. Further, when the "wired LAN" is selected by the user, the CPU 201 firstly displays a screen, such as the screen 603 in FIG. 6, to confirm to the user whether to connect the host terminal 102 and the printer 101 using the "wired LAN". Then, when it is confirmed that the host terminal 102 and the printer 101 are to be connected using the "wired LAN" (when the "YES" button is pressed), a screen to encourage the user to connect the printer 101 and the host terminal 102 using the wired LAN is displayed. Further, when the "USB" is selected by the user, the CPU 201 displays a screen, such as a screen 604 in FIG. 6, to confirm to the user whether to connect the host terminal 102 and the printer 101 using the "USB". Then, when it is confirmed that the host terminal 102 and the printer 101 are to be connected using the "USB" (when the "YES" button is pressed), a screen to encourage the user to connect the printer 101 and the host terminal 102 using a USB cable is displayed. Here, when "Do not connect now" is selected by the user, the CPU 201 firstly displays a screen, such as a screen 605 of FIG. 6, to confirm to the user whether the setting process does not need to be executed. Then, when it is confirmed that the setting process does not need to be executed (when "YES" button is pressed), none of the setting processes is executed. After S417, the CPU 201 ends the connection setting process illustrated in FIGS. 4A to 4C and proceeds to S311.

In S403, the CPU 201 determines whether a USB cable is connected to the printer 101. When it is determined that a USB cable is not connected to the printer 101, the CPU 201 proceeds to S404. On the other hand, when it is determined that a USB cable is connected, the CPU 201 proceeds to S418.

The case where a USB cable is connected to the printer 101 is, for example, a case that the printer 101 and the host terminal 102 are connected using the USB cable since the user has selected a USB as a communication method between the printer 101 and the host terminal 102. In such a case, since it is preferable that the communication between the printer 101 and the host terminal 102 is performed by using a USB thereafter, a connection setting for wireless communication is not needed. Thus, when the USB cable is connected to the printer 101, the connection setting process is ended.

In S404, the CPU 201 determines whether the user has performed an operation to switch the printer 101 to a connection setting mode while the start screen 501 is being displayed. When it is determined that the user has performed an operation to switch the printer 101 to the connection setting mode, the CPU 201 proceeds the process to S405 and, when it is determined that the user has not performed the operation to switch the printer 101 to the connection setting mode, the CPU 201 returns to S402.

In S405, the CPU 201 switches the printer 101 to the connection setting mode. With this configuration, the printer 101 enables the AP 209 for the connection setting mode. In other words, it enters a condition in which a beacon including an SSID or the like of the printer 101 is regularly transmitted, which is a condition in which information included in the beacon can be provided in response to an AP search from the terminal apparatus (the host terminal 102 or the like). In this condition, when a connection request is received from the host terminal 102, switching of connection parameters or the like may be performed between the apparatus and the printer 101 and the host terminal 102 are connected via the AP 209. Further, in this case, the CPU 201 may blink a light emitting diode (LED) of the display operating unit or perform a certain display on the LCD to notify the user that the printer 101 is switched to the connection setting mode. Further, since the printer 101 is switched to the connection setting mode, the CPU 201 displays a connection standby screen (for example, the screen 502 in FIG. 5) to notify the user that the connection with the host terminal 102 is ready. Here, an operation that the user needs to perform in the connection setting process is described in the manual provided with the printer 101. Thus, on the connection standby screen, a message to notify the user that an operation proceeds according to the manual may be displayed.

In S406, the CPU 201 determines whether the USB cable is connected to the printer 101. When it is determined that the USB cable is not connected to the printer 101, the CPU 201 proceeds to S407 and, when it is determined that the USB cable is connected, the CPU 201 proceeds to S418.

In S418, the CPU 201 cancels the connection setting mode of the printer 101. More specifically, the CPU 201 disables the AP 209 for the connection setting mode, the transmission of a beacon is stopped. After that, the CPU 201 ends the connection setting process illustrated in FIGS. 4A to 4C and proceeds to S311.

In S407, the CPU 201 determines whether an error has occurred in the printer 101. The explanation of the detail of the process in S407 will be omitted since it is same as that in S402. When it is determined that an error has occurred in the printer 101, the CPU 201 proceeds to S419 and, when it is determined that an error has not occurred in the printer 101, the CPU 201 proceeds to the process to S408.

The explanation of the details of the process in S419 will be omitted since the process is same as that in S418. After S419, the CPU 201 proceeds to S420 in FIG. 4C.

In S408, the CPU 201 determines whether an operation to cancel the connection setting process has been received from the user. The operation to cancel the connection setting process is, for example, an operation to press a predetermined key for canceling the connection setting process. The predetermined key to cancel the connection setting process may be a physical key included in the operation unit 204 or may be a softkey displayed on the display unit 205. When it is determined that an operation to cancel the connection setting process has not been received from the user, the CPU 201 proceeds to the process in S409 and, when it is determined an operation to cancel the connection setting process has been received from the user, the CPU 201 proceeds to S422.

When it is determined that the cancel operation has been received in S408, the CPU 201 does not immediately cancel the connection setting mode and proceeds to S422 and firstly provides the user with a plurality of interfaces including an interface, which is not the "wireless LAN". Since details of the process in S422 are same as those in S415 and the details of the process in S421 are same as those in S416, the explanation thereof will be omitted.

In S424, the CPU 201 determines whether the host terminal 102 and the printer 101 are connected via the AP 209. When it is determined that the host terminal 102 and the printer 101 are connected, the CPU 201 proceeds to S410 and, when it is determined that the host terminal 102 and the printer 101 are not connected, the CPU 201 proceeds to S425.

In S425, the CPU 201 determines whether setting information has been received from the host terminal 102 connected via the AP 209. When it is determined that the setting information has been received from the host terminal 102, the CPU 201 proceeds to S414 and, when it is determined that the setting information has not been received from the host terminal 102, the CPU 201 proceeds to S426.

In S426, the CPU 201 determines whether the connection setting process has timed out. The time out of the connection setting process means that the printer 101 has not been connected to a device outside the printer 101 for a predetermined period of time or more after the printer 101 is switched to the connection setting mode in S405 or that the setting information has not been received. When it is determined that the connection setting process is timed out, the CPU 201 proceeds to S427. Here, at this timing, the CPU 201 may notify the user by displaying, on the display unit 226, that the process is timed out or that a USB connection with the terminal apparatus is recommended. When it is determined that the connection setting process has not timed out, the CPU 201 returns to S423.

Since the details of the process in S427 are same as those in S418 and the details of the process in S428 are same as those in S416, the explanation thereof will be omitted. Here, after S427, the CPU 201 may end the connection setting process illustrated in FIGS. 4A to 4C and proceed to S311.

Since the details of the process in S409 are same as those in S424, the explanation thereof will be omitted. When it is determined that the host terminal 102 and the printer 101 have been connected, the CPU 201 proceeds to S410 and, when it is determined that the host terminal 102 and the printer 101 have not been connected, the CPU 201 returns to S406.

In S410, since the host terminal 102 and the printer 101 are connected, the CPU 201 displays a connecting screen (for example, the screen 503 in FIG. 5) to notify the user that the connection setting process is being executed.

Since the details of the process in S411 are same as those in S402, explanation thereof will be omitted. In a case of determination of YES, the CPU 201 proceeds to S419 and, in a case of determination of NO, the CPU 201 proceeds to S412.

In S412, the CPU 201 determines whether cancel information to cancel the connection setting mode is received from the host terminal 102 being connected via the AP 209. The cancel information is transmitted from the host terminal 102 when the user executes a cancel operation, on the host terminal 102, to cancel the connection setting mode. When it is determined that cancel information has been received from the host terminal 102, the CPU 201 proceed to S422 and, when it is determined that cancel information has not been received from the host terminal 102, the CPU 201 proceed to S413.

Since the details of the process in S413 are same as those in S425, the explanation thereof will be omitted. When it is determined that the setting information has been received from the host terminal 102, the CPU 201 proceeds to S414 and, when it is determined that the setting information has not been received from the host terminal 102, the CPU 201 proceeds to S429.

Since the details of the process in S429 are same as those in S426, explanation thereof will be omitted. In a case of determination of YES, the CPU 201 proceeds to S430 and, in a case of determination of NO, the process in S411 is re-executed. Since the details of the process in S430 are same as those in S418, the explanation thereof will be omitted.

In S414, the CPU 201 performs a setting process based on the received setting information. More specifically, firstly, the CPU 201 cancels the connection setting mode and disenables the AP 209. This once cancels the connection between the AP 209 and the terminal apparatus. After that, the CPU 201 sets the communication mode based on the received setting information. More specifically, when information corresponding to an INFRA mode (AP information or the like) is received as setting information, the CPU 201 registers an AP corresponding to the setting information to the RAM 203 as an AP to be used in the INFRA mode and executes a connection process with the AP. Further, when an encryption key is needed to use the AP, the CPU 201 performs registration of an encryption key or the like. Then, when the registration of the AP is properly finished, the CPU 201 sets, in the printer 101, the INFRA mode which enables a connection via a registered AP. With this configuration, the printer 101 operates in a condition that a wireless connection with the terminal apparatus can be performed via the registered AP. Further, when information corresponding to a WFD mode or a soft AP mode is received as the setting information, the CPU 201 transmits connection information for connecting with an AP corresponding to the WFD mode or the soft AP mode to the terminal apparatus, which is a transmission source of the setting information, before the connection setting mode is canceled. Then, after the connection setting mode is canceled, the CPU 201 enables an AP corresponding to the WFD mode and the soft AP mode and operates in the WFD mode and the soft AP mode. When a connection request including connection information which is transmitted before canceling the connection setting mode is received from the terminal apparatus, which is a transmission source of the setting information, the CPU 201 connects the printer 101 and the terminal apparatus using a P2P method in this state. With this, the printer 101 operates in a condition wirelessly connectable to the terminal apparatus by P2P. After that, the CPU 201 ends a connection setting process illustrated in FIGS. 4A to 4C and proceeds to S311.

In this manner, according to the present embodiment, the connection setting mode is not canceled at the timing when the user performs a cancel operation. When a selection operation is received from the user after a cancel operation is performed, the connection setting mode is canceled. This is because the cancel operation may be an incorrect operation by the user. Such a configuration can prevent the process for canceling the connection setting mode and for setting the communication mode of a wireless LAN from being interrupted due to an incorrect operation by the user. However, since this configuration is not essential, for example, the connection setting mode may be canceled at the timing when the user performs the cancel operation.

FIG. 7 is a flowchart illustrating a process flow that the host terminal 102 sets a communication mode to the communication apparatus according to the present embodiment. Here, the flowchart is realized by the CPU 221 that loads a control program, which is related to the flowchart and stored in the ROM 222 or an external storage (not illustrated), to the RAM 223 and executes the control program.

Firstly, in S701, the CPU 221 receives an operation by the user and activates a wireless LAN setting application. The wireless LAN setting application is an application for setting a communication mode to the printer 101. Here, the wireless LAN setting application may include another function such as a function for transmitting a print job to the printer 101 and causing the printer to execute the printing. The wireless LAN setting application is a program stored in a storage device (not illustrated) inside the host terminal 102 and installed to the host terminal 102 by the user in advance. A later described process for setting a communication mode is realized by the CPU 221 that executes the wireless LAN setting application.

Here, an example for setting the printer 101 in the INFRA mode by registering an AP to be used in the INFRA mode to the printer 101 with the wireless LAN setting application will be described. Here, the registration of an AP may be performed by using a service on the Internet via a web browser or the other functions of the host terminal 102 and the printer 101 without using the wireless LAN setting application. Further, at this time, the CPU 221 temporarily stores, in the RAM 223, AP information of an AP to which the host terminal 102 is connected.

Next, in S702, the CPU 221 searches for an AP which the host terminal 102 can access, via the communication unit 224. The AP search may be automatically executed at the timing when the wireless LAN setting application is activated or may be executed in response to an instruction from the user. The AP search is performed by the communication unit 224 that receives a beacon transmitted from each AP.

In S703, the CPU 221 causes the display unit 226 to display a list of APs (AP search results) found in the AP search in S702. In this case, for example, the CPU 221 displays a list of the SSID of each AP. Here, in S703, the CPU 221 may have a configuration for automatically extracting an AP having an SSID applicable to the above described rules, which composes the SSID of the AP 209, and displaying the extracted AP. In this case, when there are multiple SSIDs applicable to the above rules, the plurality of SSIDs are displayed and selected by the user. Further, with this configuration, a later described process in S705 may not have to be executed.

When the APs are displayed in S703, the user selects an AP in the communication apparatus, which is a setting target of the communication mode, from the search result.

In S704, the CPU 221 detects that the selection of an AP by the user is received.

In S705, the CPU 221 determines whether the AP selected in S704 is an AP in the communication apparatus which is a setting target of the wireless LAN setting application. In this case, more specifically, the CPU 221 determines whether the selected AP is an AP which has an SSID applicable to the above rule, which composes the SSID of the AP 209. When it is determined that the selected AP is not an AP in the communication apparatus as a setting target, the CPU 221 again waits for detecting an AP selected by the user. Here, at this timing, the CPU 221 may display, on the display unit 226, a screen for notifying the user that an improper AP is selected. Further, the CPU 221 may have a configuration to end the process when there is no AP corresponding to the communication apparatus as a setting target or when there is not AP in a communication apparatus desired by the user.

Here, in the above description, with the processes in S703 to S705, a configuration for letting the user manually select an AP in a communication apparatus as a setting target in communication mode has been explained; however, it is not limited to this configuration. For example, the CPU 221 may automatically select an AP having an SSID applicable to the above rule from the APs searched in S702 as an AP of the communication apparatus as a setting target in the communication mode.

When a communication apparatus as a setting target (here, the AP in the printer 101 (here, the AP 209)) is selected in S705, the CPU 221 exchanges parameters (connection information) which are used to perform a wireless connection between the host terminal 102 and the printer 101. Here, the connection information used to connect with the AP 209 is stored by the wireless LAN setting application in advance. With this, the host terminal 102 connects to the AP 209 and establishes a communication with the printer 101.

Next, in S706, the CPU 221 transmits, as setting information, the AP information temporarily stored in the RAM 223 in S701 to the printer 101, which is a communication apparatus, via the AP 209 connected in S705. When the AP information is received, the printer 101 is set in the INFRA mode connectable via an AP based on the AP information.

Finally, in S707, the CPU 221 becomes communicable with the printer 101 via the AP by canceling the connection to the AP 209 and re-connecting to the AP base on the AP information temporarily stored in the RAM 223 in S701. Here, the CPU 221 registers the printer 101 to the RAM 223 as a communication apparatus to which the host terminal 102 will be connected. After that, the CPU 221 ends the wireless LAN setting application.

Here, the processes in S702 to S704 may not be always performed by the wireless LAN setting application, the AP 209 may be searched by using another application previously installed in the host terminal 102, and the result may be obtained by the wireless LAN setting application.

Further, in the above description, since the CPU 221 is communicating with the printer 101 via the AP 209, the setting information is transmitted to the printer 101 with a communication method compatible with IEEE 802.11 series (that is, Wi-Fi®). However, this configuration does not set any limitation and the CPU 221 may, for example, transmit the setting information to the printer 101 with a communication method which is different from the communication method compatible with IEEE 802.11 series. The communication method used here may be, for example, Bluetooth® Classic, Bluetooth® Low Energy, near field communication, Wi-Fi Aware™, and the like. With such a configuration, the CPU 221 can transmit the setting information to the printer 101 with another communication method as maintaining a Wi-Fi® connection with the AP used in the INFRA mode.

Further, the above description has described a configuration that the CPU 221 sets an INFRA mode to the printer 101; however, this configuration does not set any limitation. For example, another communication mode, such as a WFD mode, a soft AP mode, or the like, may be set to the printer 101. The communication mode set to the printer 101 may be determined by receiving a selection by the user via a screen displayed by the wireless LAN setting application or may be automatically determined by the wireless LAN setting application based on a communication environment of the host terminal 102. For example, when a communication mode is set to the printer 101, the INFRA mode is selected as a communication mode to be set to the printer 101 if the host terminal 102 is connected to any one of the APs. Further, for example, when a communication mode is set to the printer 101, a P2P system communication mode, such as the WFD mode, soft AP mode, or the like, is selected as a communication mode to be set to the printer 101 if the host terminal 102 is not connected to any of the APs.

Other Embodiments

According to the above described embodiment, the processes in the printer 101 and the host terminal 102 are processes performed at the initial setting timing of the printer 101; however, this example does not set any limitation. For example, the processes in the printer 101 and the host terminal 102 may be executed when the wireless LAN setting in the printer 101 is disabled or may be executed when an initializing process of the printer 101 is executed. Further, for example, the processes may be executed when the printer 101 is turned on regardless whether the printer 101 is in the initial setting state.

The above description has described a configuration which is applied to a communication apparatus that operates in one of a plurality of conditions including a first condition for executing a certain operation for receiving an operation by the user to install a certain item to be installed and a second condition that the certain operation is not executed. The above description has described a configuration that the certain item to be installed is a print head, the certain operation is to move a carriage, and the communication apparatus is a printing apparatus; however, this configuration does not set any limitation. For example, in a case where the communication apparatus is a laser beam printer, the item to be installed may be a toner cartridge. Further, for example, in a case where the communication apparatus is a PC, the certain item to be installed may be a storage medium such as a CD, a DVD, or the like, and the certain operation may be to move a cassette to which the storage medium is installed or to open or close an insertion slot of the storage medium.

The above description has described a configuration that switches whether to perform a connection setting process before a cleaning process or to perform a connection setting process after the cleaning process depending on whether the item to be installed is installed in the first condition or the item to be installed is installed in the second condition; however, this configuration does not set any limitation. In other words, the connection setting process may be performed before the cleaning process regardless of whether the item to be installed is installed in the first condition or the item to be installed is installed in the second condition. Further, the connection setting process may be performed after the cleaning process regardless of whether the item to be installed is installed in the first condition or the item to be installed is installed in the second condition.

Here, the above description has described a configuration that the printer 101 receives setting information while operating in the connection setting mode. However, it is not limited to this configuration, and for example, there may be a configuration that the setting information is received using a communication method other than WLAN in a condition that the printer 101 and the host terminal 102 are connected with the communication method other than WLAN. In other words, for example, in response to a soft-on process at an initial setting timing, the printer 101 may start an operation as being communicable with the host terminal 102 using a communication method other than WLAN. The communication method other than WLAN may be, for example, Bluetooth® Classic, Bluetooth® Low Energy, or NFC.

The above described embodiment may be realized by executing the following process. In other words, software (program) that realizes the functions of the above described embodiment is provided to a system or a device via a network or various storage media and a computer (a CPU, an MPU, or the like) of the system or device reads and executes the program. Further, a single computer may execute the program, or a plurality of computers may work together and execute the program. Further, all the above described processes do not have to be realized by the software and a part of the processes or all the processes may be realized by hardware, such as ASIC and the like. Further, the CPU is not limited to a single CPU that performs all the process, and more than one CPUs may work together and perform the processes.

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims the benefit of Japanese Patent Application No. 2017-154664, filed Aug. 9, 2017, which is hereby incorporated by reference herein in its entirety.

What is claimed is:

1. A communication apparatus comprising:
    at least one storage medium; and
    at least one processor configured to cause the communication apparatus to:
    operate in a predetermined condition in which the communication apparatus is able to receive, from a terminal apparatus, setting information related to a first communication setting for communicating with the terminal apparatus using a first communication method;
    receive the setting information from the terminal apparatus while the communication apparatus is operating in the predetermined condition;
    execute the first communication setting in a case where the setting information is received from the terminal apparatus;
    receive, by a user operation to the communication apparatus before the setting information is received from the terminal apparatus while the communication apparatus is operating in the predetermined condition, a cancel instruction to cancel an execution of the first communication setting;
    display, on a display unit of the communication apparatus while the predetermined condition is maintained, a predetermined screen to execute a second communication setting that allows the communication apparatus to communicate with the terminal apparatus using a second communication method, which is different from the first communication method, based on that the cancel instruction is received while the communication apparatus is operating in the predetermined condition;
    receive, by the user operation to the communication apparatus on the display unit of which the predetermined screen is displayed, an execution instruction to execute the second communication setting;
    execute the second communication setting based on that the execution instruction to execute the second communication setting is received; and
    stop an operation in the predetermined condition based on that the execution instruction to execute the second communication setting is received;
    wherein, by execution of the second communication setting, the communication apparatus becomes able to communicate with the terminal apparatus using the second communication method.

2. The communication apparatus according to claim 1, wherein the predetermined condition is a condition that a predetermined access point in the communication apparatus is enabled.

3. The communication apparatus according to claim 1, wherein an operation in the predetermined condition is started in the communication apparatus when power of the communication apparatus is turned on in an initial setting state that the first communication setting has not been executed in the communication apparatus.

4. The communication apparatus according to claim 1, wherein an operation in the predetermined condition is stopped in the communication apparatus when a predetermined period of time has passed after the operation in the predetermined condition is started in the communication apparatus.

5. The communication apparatus according to claim 1, wherein the predetermined screen is displayed after at least one of a screen to inquire a user whether to cancel the first communication setting and a screen to inquire the user whether to execute communication setting that allows the communication apparatus to communicate with the terminal apparatus by using the second communication method is displayed on the display unit, in a case where the cancel instruction is received.

6. The communication apparatus according to claim 1, wherein the first communication method is a communication method compatible with IEEE 802.11 series.

7. The communication apparatus according to claim 1, wherein the second communication method is a universal serial bus.

8. The communication apparatus according to claim 1, wherein the first communication setting is at least one of a setting that allows the communication apparatus to directly communicate with the terminal apparatus by using the first communication method without using a device outside the communication apparatus and outside the terminal apparatus, and a setting that allows the communication apparatus to communicate with the terminal apparatus by using the first communication method via the device outside the communication apparatus and outside the terminal apparatus.

9. The communication apparatus according to claim 1, wherein
the first communication setting is a setting for communicating via an external device, and
the setting information includes connection information used to connect with a device outside the communication apparatus and outside the terminal apparatus.

10. The communication apparatus according to claim 1, wherein the second communication setting includes a process to display, on the display unit, a screen to encourage a user to connect the communication apparatus and the terminal apparatus by using the second communication method.

11. The communication apparatus according to claim 1, wherein an operation in the predetermined condition is not started in the communication apparatus in a case where the communication apparatus and the terminal apparatus are connected by using a predetermined communication method other than the first communication method before the communication apparatus operates in the predetermined condition.

12. The communication apparatus according to claim 11, wherein the predetermined communication method is Universal Serial Bus.

13. The communication apparatus according to claim 1, wherein an operation in the predetermined condition is stopped in the communication apparatus in a case where the communication apparatus and the terminal apparatus are connected by using a predetermined communication method other than the first communication method while the communication apparatus is operating in the predetermined condition.

14. The communication apparatus according to claim 1, wherein the predetermined screen is displayed on the display unit in a case where an error occurs in the communication apparatus while the communication apparatus is operating in the predetermined condition.

15. The communication apparatus according to claim 1, wherein an operation in the predetermined condition is stopped in the communication apparatus in a case where an error occurs in the communication apparatus while the communication apparatus is operating in the predetermined condition.

16. The communication apparatus according to claim 1, wherein the at least one processor further controls a printing unit configured to perform printing on a print medium with a printing material.

17. The communication apparatus according to claim 1, wherein, in a case where the cancel instruction is received while the communication apparatus is operating in the predetermined condition, the predetermined screen is displayed on the display unit before the operation in the predetermined condition is stopped, and
wherein, in a case where an error regarding the first communication method occurs in the communication apparatus while the communication apparatus is operating in the predetermined condition, the predetermined screen is displayed on the display unit after the operation in the predetermined condition is stopped.

18. A control method of a communication apparatus, comprising:
causing the communication apparatus to operate in a predetermined condition in which the communication apparatus is able to receive, from a terminal apparatus, setting information related to a first communication setting for communicating with the terminal apparatus using a first communication method;
receiving the setting information from the terminal apparatus while the communication apparatus is operating in the predetermined condition;
executing the first communication setting in a case where the setting information is received by the communication apparatus from the terminal apparatus;
receiving, by a user operation to the communication apparatus before the setting information is received from the terminal apparatus while the communication apparatus is operating in the predetermined condition, a cancel instruction to cancel an execution of the first communication setting;
displaying, on a display unit of the communication apparatus while the predetermined condition is maintained, a predetermined screen to execute a second communication setting that allows the communication apparatus to communicate with the terminal apparatus using a second communication method, which is different from the first communication method, based on receiving the cancel instruction while the communication apparatus is operating in the predetermined condition;
receiving, by the user operation to the communication apparatus on the display unit which displays the predetermined screen, an execution instruction to execute the second communication setting;
executing the second communication setting based on receiving the execution instruction to execute the second communication setting, wherein, by executing the second communication setting, the communication apparatus becomes able to communicate with the terminal apparatus using the second communication method; and
stopping an operation in the predetermined condition based on receiving the execution instruction to execute the second communication setting.

19. A non-transitory computer-readable medium storing a program that causes a computer in a communication apparatus to execute:
causing the communication apparatus to operate in a predetermined condition in which the communication apparatus is able to receive, from a terminal apparatus, setting information related to a first communication setting for communicating with the terminal apparatus using a first communication method;

receiving the setting information from the terminal apparatus while the communication apparatus is operating in the predetermined condition;

executing the first communication setting in a case where the setting information is received by the communication apparatus from the terminal apparatus;

receiving, by a user operation to the communication apparatus before the setting information is received from the terminal apparatus while the communication apparatus is operating in the predetermined condition, a cancel instruction to cancel an execution of the first communication setting;

displaying, on a display unit of the communication apparatus while the predetermined condition is maintained, a predetermined screen to execute a second communication setting that allows the communication apparatus to communicate with the terminal apparatus using a second communication method, which is different from the first communication method, based on receiving the cancel instruction while the communication apparatus is operating in the predetermined condition;

receiving, by the user operation to the communication apparatus on the display unit which displays the predetermined screen, an execution instruction to execute the second communication setting;

executing the second communication setting based on receiving the execution instruction to execute the second communication setting, wherein, by executing the second communication setting, the communication apparatus becomes able to communicate with the terminal apparatus using the second communication method; and stopping an operation in the predetermined condition based on receiving the execution instruction to execute the second communication setting.

* * * * *